March 25, 1952    J. DELASTRE ET AL    2,590,298
WINDING IN COLLECTOR MACHINE
Filed Jan. 18, 1949

INVENTORS:
J. DELASTRE, L. GALZIN
and P. LETRILLIART

By Wenderoth, Lind &
Ponack    ATTORNEYS

Patented Mar. 25, 1952

2,590,298

UNITED STATES PATENT OFFICE 2,590,298

WINDING IN COLLECTOR MACHINE

Jean Delastre, Louis Galzin, and Pierre Letrilliart, Jeumont, France, assignors to Societe Anonyme Dite: Forges & Ateliers De Constructions Electriques De Jeumont, Paris, France Application January 18, 1949, Serial No. 71,514
In France January 21, 1948

13 Claims. (Cl. 171—228)

It has been proposed to facilitate the construction of collector machines by means of special windings in double parallel. These machines are improved by an appropriate choice of the number of the commutator segments, this number being determined in such a way that the equipotential connections play the role of interconnections between the two windings. They are further improved by appropriate choice of the number of the brush carrying rods and by an appropriate width of the brushes, chosen in a way to provide half-turn commutation through the intermediary of a portion of the winding which plays the role of resistance connections. Such machines have been described in French Patent No. 784,065 published in 1935.

The practical use of these means encounters in certain cases limitations and more particularly when all the brush carrying rods have to be placed upon the collector and when the winding is subjected in normal operation to a flux whose frequency exceeds a certain value, or also when the width of the brushes can not be reduced to a suitable value.

The present invention has for an object facilitating the use of these means and of rendering this use possible in all single phase or direct current collector machines having 4 poles or a multiple of 4 poles.

It has also for an object the replacing of the double lap windings by wave windings in multiple series.

Another object of the invention consists in improving the commutation by appropriate connections between the stator circuits and the brushes which may be subdivided.

In accordance with the present invention the difficulties and limitations indicated above are avoided particularly by a perfect symmetry of the winding obtained by the combined use of an odd number of slots per double polar pitch and by the use of an odd number of sections per slot, as well as by the use of an optimum winding pitch and of suitably connected divided brushes.

The annexed drawing shows schematically and by way of non-limiting example some embodiments of the present invention, in which Fig. 1 illustrates diagrammatically a double parallel winding in accordance with the invention for a machine having four poles;

Figure 1:
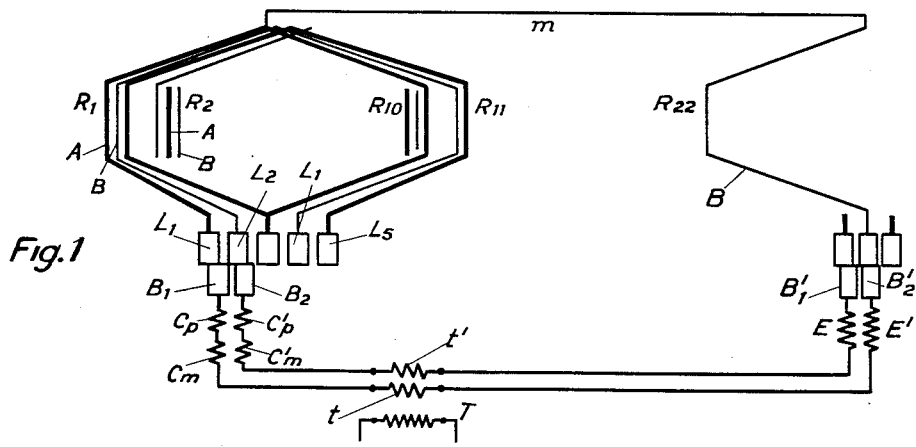

Fig. 1 shows a double parallel winding in accordance with the invention as provided for a machine with four poles. In the example considered the armature comprises 42 slots indicated by $R_1$ $R_2$ etc. and two distinct windings in simple parallel indicated by A and B. The first winding A is connected to the segments $L_1$ $L_3$ $L_5$ $L_7$ etc. of the collector. The second winding B is connected to the segments $L_2$ $L_4$ $L_6$ $L_8$ etc. of the same collector. The equipotential connections $m$ of a suitably chosen section connect the conductors of the segments $L_1$—$L_{64}$ etc. These connections can be placed either at the collector side or at the opposed side of the machine as for the winding described in the French Patent No. 784,065.

Figure 2:
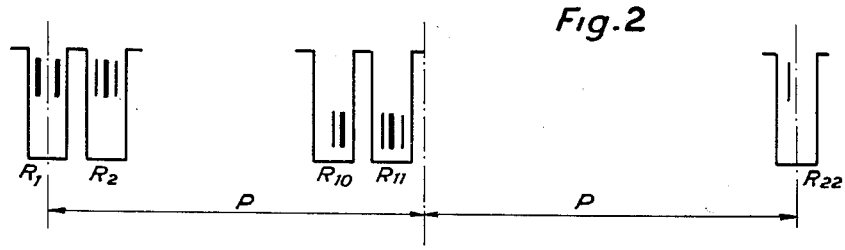
Fig. 2 illustrates schematically the disposition of certain conductors.

The magnetic symmetry is perfect as is shown in Fig. 2 which shows the position of the corresponding slots with relations to the double pole pitch 2P.

Upon Figs. 1 and 2 certain conductors have shown in heavy lines in order to show more clearly the respective positions of the two windings in the slots. It will be noted particularly that the conductors, connected by the equipotential connections $m$ and pertaining respectively to the windings A and B occupy the same positions in the slots such as $R_1$ and $R_{22}$ which are themselves located in the same way in the inductive field.

This arrangement permits furthermore, without destroying the symmetry of the winding, providing a shortened winding pitch which is most favorable from the point of view of commutation.

It is also possible to provide between the commutator segments of a winding and the equipotential points of the other winding, connections which have suitable impedances.

The combined use of such windings and divided brushes $B_1$, $B_2$, $B_1'$, $B_2'$, etc. assures practically, regardless of the width of the brushes, the following advantages:

(1) A half-turn commutation is produced with an effect which is equivalent to that of resistance connections.

(2) A part of the brush may be eliminated without interfering with the commutation.

(3) One may adopt very elevated voltages per turn without interfering with the commutation.

In place of the double lap winding of Fig. 1 one may also use a wave winding in multiple series having the same essential characteristics, namely, an odd number of sections per slot and an odd number of slots per double pole pitch. Such a type of series winding may preferably comprise a number of winding paths greater than the number of poles and it can also be constructed with the optimum winding pitch. The same advantages are secured by the concomitant use of suitably divided brushes and appropriate equipotential connections.

Such a type series wave winding can be used alone or in association with a winding of the double parallel lap type described above and having the same number of winding paths.

In the case of such an association, the two windings are connected to the same commutator segments in such a way that the current divides into each of them and that they connect the respective equipotential points. The connections thus formed and each comprising a lap turn and a wave turn permit eliminating the auxiliary connections $m$ which are necessary in the case of Fig. 1. In order to completely obtain all the specific advantages set forth above regardless of the width of the brushes used it is preferable to use them in combination with divided brushes, as shown in Fig. 1.

Figure 3:
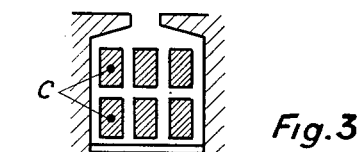
Fig. 3 is a cross-sectional view illustrating the arrangement of the conductors in the slots of a combined winding machine.
Figure 4:
Fig. 4 is a similar view.

Figs. 3 and 4 of the annexed drawing show schematically two examples of arrangements of the conductors in the slots of a combined winding. Upon these Figs. 3 and 4 the two windings indicated by A and B form the double parallel winding, while C is a series wave winding.

Fig. 3 shows the winding C with its odd number of conductors by layer, located above the two windings A and B. It is to be noted that the arrangement shown may be reversed. Upon Fig. 4 the windings A and B are encased by the winding C. The reverse arrangement is also possible.

The described winding arrangements have several additional advantages. They reduce the height of the individual conductors and consequently supplementary losses. They furthermore multiply the number of turns in commutation at the same instant.

In order to obtain in collector machines using the windings mentioned above a more favorable commutation one may complete these windings by appropriate connections between the circuits of the stator and the brushes which are subdivided as indicated above.

For this purpose each brush or brush line, i. e. each group of axially aligned conventional brushes corresponding to a zone of commutation, is divided into two or more adjacent "elementary brush lines" $B_1$, $B_2$, $B_1'$, $B_2'$, etc. These elementary brush lines are insulated from one another. The subdivision is obtained either by using complete and distinct elementary lines or brushes or by dividing each brush into two or more adjacent portions, insulated one from the other.

Figure 5:
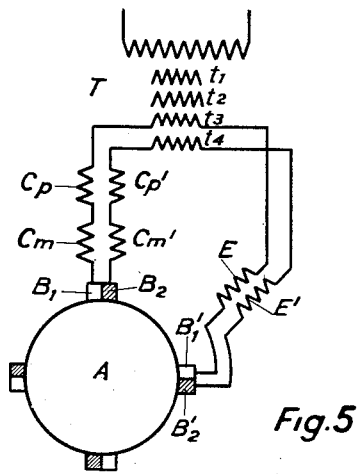
Fig. 5 shows a diagram of stator connections in a particular case.

The elementary brush lines are respectively connected to the stator windings, i. e. to the conventional commutation, compensation and field windings, in a way so as to form distinct stator circuits. In the particular case of single phase traction motors, these circuits can be supplied separately by distinct secondary windings $t$, $t'$, etc. of transformer T, as shown in Fig. 5.

The stator may thus comprise a plurality of distinct circuits. Their number may be equal either to the number of pairs of poles or preferably to the number of pairs of rotor winding paths.

In the first case where the number of stator circuits is equal to the number of pairs of poles it is sufficient to connect each elementary brush line to a corresponding stator circuit, this circuit comprising for example in the case of series compensated motors, the field windings E, E', etc., the commutation windings $C_m$, $C_m'$ etc., and compensation windings $C_p$, $C_p'$ etc., according to Fig. 1.

In considering the particular case of a machine with four pairs of poles one may therefore in accordance with the invention provide for example 16 elementary brush lines (in place of 8) 16 rotor windings paths and 4 stator circuits, each of these stator circuits comprising portions connected in parallel.

By way of example in a series single phase compensated motor with four pairs of poles, each of the 4 stator circuits may comprise two partial circuits comprising for example compensation windings $C_p$ and commutation windings $C_m$ connected at the one end to the two respective elementary brush lines of the same polarity, and in parallel at the other end.

In the case where the number of stator circuits is equal to the number of pairs of winding paths of the rotor, one may separately connect each elementary brush line to a distinct winding of the stator in a way so as to form separate and balanced circuits.

Such a case is shown in Fig. 5 illustrating the arrangement of stator circuits of Fig. 1 for a machine with two pairs of poles and which has for example 8 elementary brush lines $B_1$, $B_2$, $B_1'$, $B_2'$, etc. with 8 corresponding winding paths upon the rotor and 4 circuits upon the stator. Each of the four stator circuits comprises, as stated above, a conventional commutation winding $C_m$ or $C_m'$ etc., a compensating winding $C_p$ or $C_p'$ etc., and a field winding E or E' etc.; these are supplied separately, as in Fig. 1, by secondary windings $t_1$, $t_2$, $t_3$, $t_4$ of a supply transformer T.

The use of the above means improves the commutation by the fact on one hand that a better symmetry is secured in the machines and on the other hand because the short circuit currents under the brushes are substantially reduced.

We claim:

1. In a collector machine having $4p$ poles, means for improving the half-turn commutation, comprising a combination of multiple rotor windings with an odd number of slots per double pole pitch, an odd number of sections per slot, a shortened winding pitch with equipotential connections interposed between conductors occupying the same positions in the slots which are themselves located in the same way with respect to the magnetic field; whereby a complete electric and magnetic symmetry of the windings is obtained.

2. A collector machine according to claim 1, wherein a rotor winding of the double parallel lap type is provided.

3. A collector machine according to claim 1, wherein a rotor winding of the multiple series wave type is provided.

4. A collector machine according to claim 1, wherein a rotor winding of the multiple series wave type with a number of winding paths which is higher than the number of poles is provided.

5. A collector machine according to claim 1, wherein a rotor winding of the double lap type combined with a multiple series wave type winding is provided, both said windings being connected to the same commutator segments to form reciprocally equipotential conductors, comprising each a lap turn and a wave turn.

6. In a collector machine having $4p$ poles, means for improving the commutation and for eliminating brush-width limitations, comprising symmetrically arranged rotor windings with an odd number of slots per double pole pitch, an odd number of sections per slot and a shortened winding pitch, combined with brushes which are subdivided at least into two adjacent elementary brushes, connected separately to different stator windings in order to form a plurality of rotor and stator circuits, each stator circuit comprising commutation, compensation and field windings.

7. In a collector machine having $4p$ poles, means for improving the commutation and for eliminating brush-width limitations, comprising multiple symmetrically arranged rotor windings with an odd number of slots per double pole pitch, an odd number of sections per slot and a shortened winding pitch, combined with brushes which are subdivided at least into two adjacent elementary brushes, connected separately to different stator windings in order to form a plurality of rotor and stator circuits, each stator circuit comprising commutation, compensation and field windings, and the number of said stator circuits being equal to the number of pairs of poles.

8. In a collector machine having $4p$ poles, means for improving the commutation and for eliminating brush-width limitations, comprising multiple symmetrically arranged rotor windings with an odd number of slots per double pole pitch, an odd number of sections per slot and a shortened winding pitch, combined with brushes which are subdivided at least into two adjacent elementary brushes, connected separately to different stator windings in order to form a plurality of rotor and stator circuits, each stator circuit comprising commutation, compensation and field windings, and the number of said stator circuits being equal to the number of pairs of rotoric winding paths.

9. In a collector machine having $4p$ poles, means for improving the commutation and for eliminating brush-width limitations, comprising a symmetrically arranged double parallel rotor winding with an odd number of slots per double pole pitch, an odd number of sections per slot and a shortened winding pitch, combined with brushes which are subdivided at least into two adjacent elementary brushes, connected separately to distinct stator windings in order to form a plurality of rotor and stator circuits, each stator circuit comprising commutation, compensation and field windings.

10. In a collector machine having $4p$ poles, means for improving the commutation and for eliminating brush-width limitations, comprising a symmetrical wave winding in multiple series upon the rotor, with an odd number of slots per double pole pitch, an odd number of sections per slot and a shortened winding pitch, combined with brushes which are subdivided at least into two adjacent elementary brushes, connected separately to distinct stator windings in order to form a plurality of rotor and stator circuits, each stator circuit comprising commutation, compensation and field windings.

11. In a collector machine having $4p$ poles, means for improving the commutation and for eliminating brush-width limitations, comprising multiple symmetrically arranged rotor windings with an odd number of slots per double pole pitch, an odd number of sections per slot and shortened winding paths, said rotor windings being formed by a wave winding in multiple series, combined with a winding of the double parallel lap type, both said windings being connected to the same commutator segments to form respectively equipotential conductors comprising each a lap turn and a wave turn, and associated with brushes which are subdivided at least into two adjacent elementary brushes, connected separately to distinct stator windings in order to form a plurality of rotor and stator circuits, each stator circuit comprising commutation, compensation and field windings.

12. A combined rotor winding according to claim 11, wherein an arrangement of conductors in each slot is provided, comprising an odd number of conductors by layer, and equipotential conductors interconnected between slot conductors which have exactly the same positions in the slots and in the field.

13. In a single phase collector machine having $4p$ poles, means for improving the commutation and for eliminating brush-width limitations, comprising symmetrically arranged multiple rotor windings with an odd number of slots per double pole pitch, an odd number of sections per slot and a shortened winding path, combined with brushes subdivided into two adjacent elementary brushes which are connected separately to distinct stator windings in order to form a plurality of rotor and stator circuits, each stator circuit comprising commutation, compensation and field windings and being excited by a separate secondary of a common supply transformer.

DELASTRE, JEAN.
GALZIN, LOUIS.
LETRILLIART, PIERRE.

REFERENCES CITED

The following references are of record in the file of this patent:

UNITED STATES PATENTS

| Number | Name | Date |
|---|---|---|
| 783,498 | Collischonn | Feb. 28, 1905 |
| 1,628,612 | Powell | May 10, 1927 |
| 2,125,027 | Kasperowski | July 26, 1938 |
| 2,504,537 | Klima | Apr. 18, 1950 |
| 2,505,018 | Weathers | Apr. 25, 1950 |